United States Patent
Yamazaki (10) Patent No.: US 7,006,582 B2
(45) Date of Patent: Feb. 28, 2006

(54) RECEIVING CIRCUIT

(75) Inventor: Kiyohiko Yamazaki, Kanagawa (JP)

(73) Assignee: Oki Electric Industry Co., Ltd., Tokyp (JP)

( * ) Notice: Subject to any disclaimer, the term of this patent is extended or adjusted under 35 U.S.C. 154(b) by 700 days.

(21) Appl. No.: 09/894,533

(22) Filed: Jun. 29, 2001

(65) Prior Publication Data

US 2002/0041638 A1  Apr. 11, 2002

(30) Foreign Application Priority Data

Oct. 5, 2000  (JP)  ............................. 2000-306102

(51) Int. Cl.
*H03K 9/00*  (2006.01)

(52) U.S. Cl. ...................................... 375/316; 375/354

(58) Field of Classification Search ................ 375/316, 375/340, 342, 343, 354, 371, 372; 455/277.2, 455/436; 370/347
See application file for complete search history.

(56) References Cited

U.S. PATENT DOCUMENTS

| | | | |
|---|---|---|---|
| 5,894,328 A | | 4/1999 | Tahara et al. .......... 375/240.25 |
| 6,032,033 A | * | 2/2000 | Morris et al. ............. 455/277.2 |
| 6,282,422 B1 | * | 8/2001 | Aikawa et al. ............. 455/436 |
| 6,381,289 B1 | * | 4/2002 | Dutta .......................... 375/335 |
| 6,633,753 B1 | * | 10/2003 | Kido ........................ 455/343.2 |

FOREIGN PATENT DOCUMENTS

JP  09-186667  7/1997

* cited by examiner

*Primary Examiner*—Chieh M. Fan
(74) *Attorney, Agent, or Firm*—Rabin & Berdo, P.C.

(57) ABSTRACT

Disclosed herein is a receiving circuit comprising demodulator 101 which pulls in the phase of each of burst signals respectively having preambles 701 and 711 each storing phase information or data therein, synchronous pattern parts 702 and 712 each storing synchronous information therein, and data parts 703 and 713 each storing the data therein, and outputs data obtained by demodulating the burst signal, a controller 110 which performs counting based on the demodulated data to output a timing signal, and a storage unit 102 which stores or outputs the demodulated data, based on the timing signal.

5 Claims, 7 Drawing Sheets

RECEIVING CIRCUIT

BACKGROUND OF THE INVENTION

1. Field of the Invention

The present invention relates to a wireless apparatus or device suitable for use in a wireless communication system using a TDMA (Time Division Multiple Access) system, and particularly to a receiving circuit.

This application is a counterpart of Japanese patent application, Serial Number 306102/2000, filed Oct. 5, 2000, the subject matter of which is incorporated herein by reference.

2. Description of the Related Art

Figure 7:
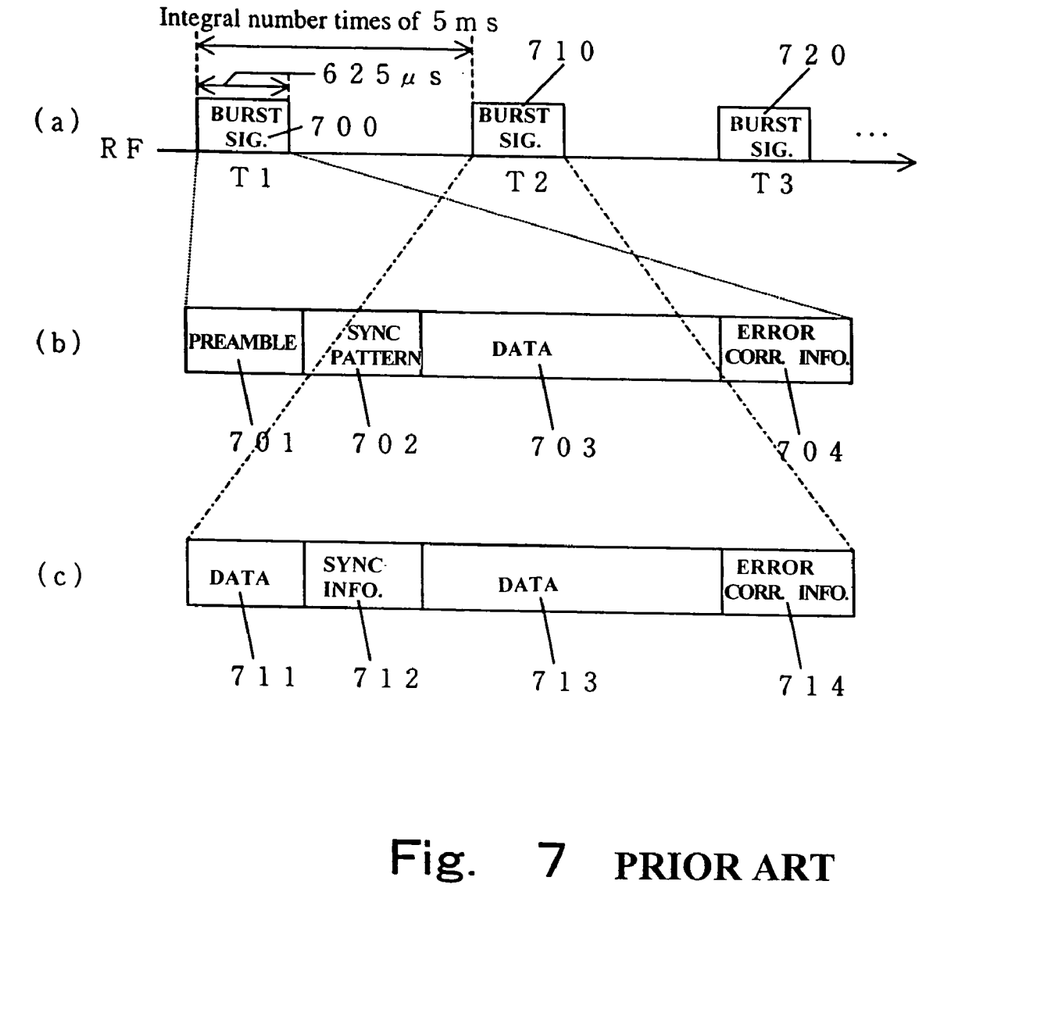
FIGS. 7(a) through 7(c) are respectively diagrams illustrating frame structures of burst signals.

As shown in FIG. 7(a), a receiving circuit suitable for use in a wireless communication system using a TDMA mode or system receives burst signals every predetermined time intervals (corresponding to 5 msec while a call is in progress and integral number times of 5 msec while no call is in progress). Each of the burst signals comprises a frame. The length of the frame is 625 μsec. A structure of the frame for each burst signal will now be explained using the drawings. FIGS. 7(b) and 7(c) are respectively diagrams showing structures of frames. The frame structures shown in FIGS. 7(b) and 7(c) are identical to each other. The frame structure will be described below using FIG. 7(b). The frame has a preamble part 701, a synchronous pattern part 702 which follows the preamble part 701, a data part 703 which follows the synchronous pattern part 702, and an error detecting data part 704 (hereinafter called CRC data part 704) which follows the data part 703. Further, the frame has a control data part such as a guard bit, etc. However, they will be omitted for convenience of explanation.

The preamble part 701 stores therein initial phase pulling-in information (hereinafter called phase information) for allowing a burst signal received from the transmitting side by the receiving side to be normally captured. The synchronous pattern part 702 stores therein synchronous pattern information (hereinafter called synchronous information) for detecting (also called capturing) the synchronism of the burst signal received by the receiving side. The data part 703 stores transmit-receive information (hereinafter called data) therein. The CRC data part 704 stores therein error-correcting code information for effecting error detection/correction on the burst signal.

Meanwhile, the conventional receiving circuit has properly detected synchronous information stored in a synchronous pattern part of a currently receiving burst signal to thereby determine a timing provided to store data of a data part of the currently receiving burst signal and has stored the data of the data part therein.

However, the conventional receiving circuit has a problem in that since a preamble part is located in a stage preceding the synchronous pattern part storing the synchronous information therein even if the synchronous information is properly detected, the timing provided to store phase information stored in the pre-stage preamble part cannot be determined.

The conventional receiving circuit also has a problem in that even if synchronous information is detected from a previously-received burst signal, the result of detection is not used for storing a burst signal to be next received.

Further, a bit error rate characteristic can be obtained by measuring the degree of an error in data with the ratio (C/N ratio) between a radio signal and noise as a parameter. Therefore, the bit error rate characteristic cannot properly be measured where the synchronous information cannot be detected. Thus, when the synchronous information is erroneously detected, the data cannot be stored and hence a bit error rate leads to about 50%. Accordingly, a problem arises in that the bit error rate cannot be measured accurately.

SUMMARY OF THE INVENTION

The present invention aims to provide a receiving circuit capable of storing information stored in a preamble part.

A summary of a typical one of the inventions disclosed in the present application will be described in brief as follows:

A receiving circuit according to the present invention comprises a demodulator which pulls in the phase of each of burst signals each having a preamble part for storing phase information or data therein, a synchronous pattern part for storing synchronous information therein, and a data part for storing the data therein and outputs data obtained by demodulating the burst signal, a controller which performs counting based on the demodulated data to output a timing signal, and a storage unit which stores or outputs the demodulated data, based on the timing signal.

According to the above means, a receiving circuit can be provided which is capable of storing information stored in a preamble part.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Receiving circuits according to preferred embodiments of the present invention will hereinafter be described in detail with reference to the accompanying drawings. The receiving circuits according to the embodiments of the present invention can be provided in a wireless device on the mobile station side and an apparatus or system on the base station side. Incidentally, components having the same functions in all the drawings for describing the receiving circuits according to the embodiments of the present invention are identified by the same reference numerals and their repetitive description will be omitted.

First Preferred Embodiment

Figure 1:
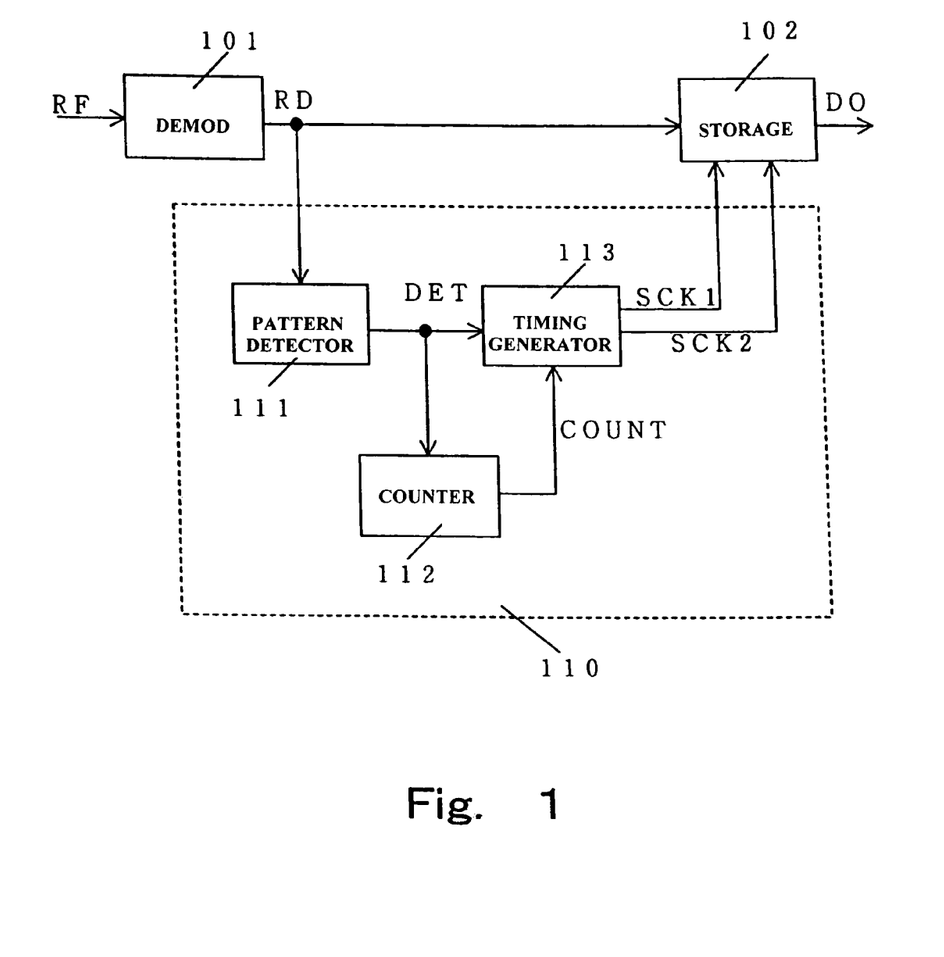
FIG. 1 is a block diagram showing a structure of a receiving circuit according to a first embodiment of the present invention.
Figure 2:
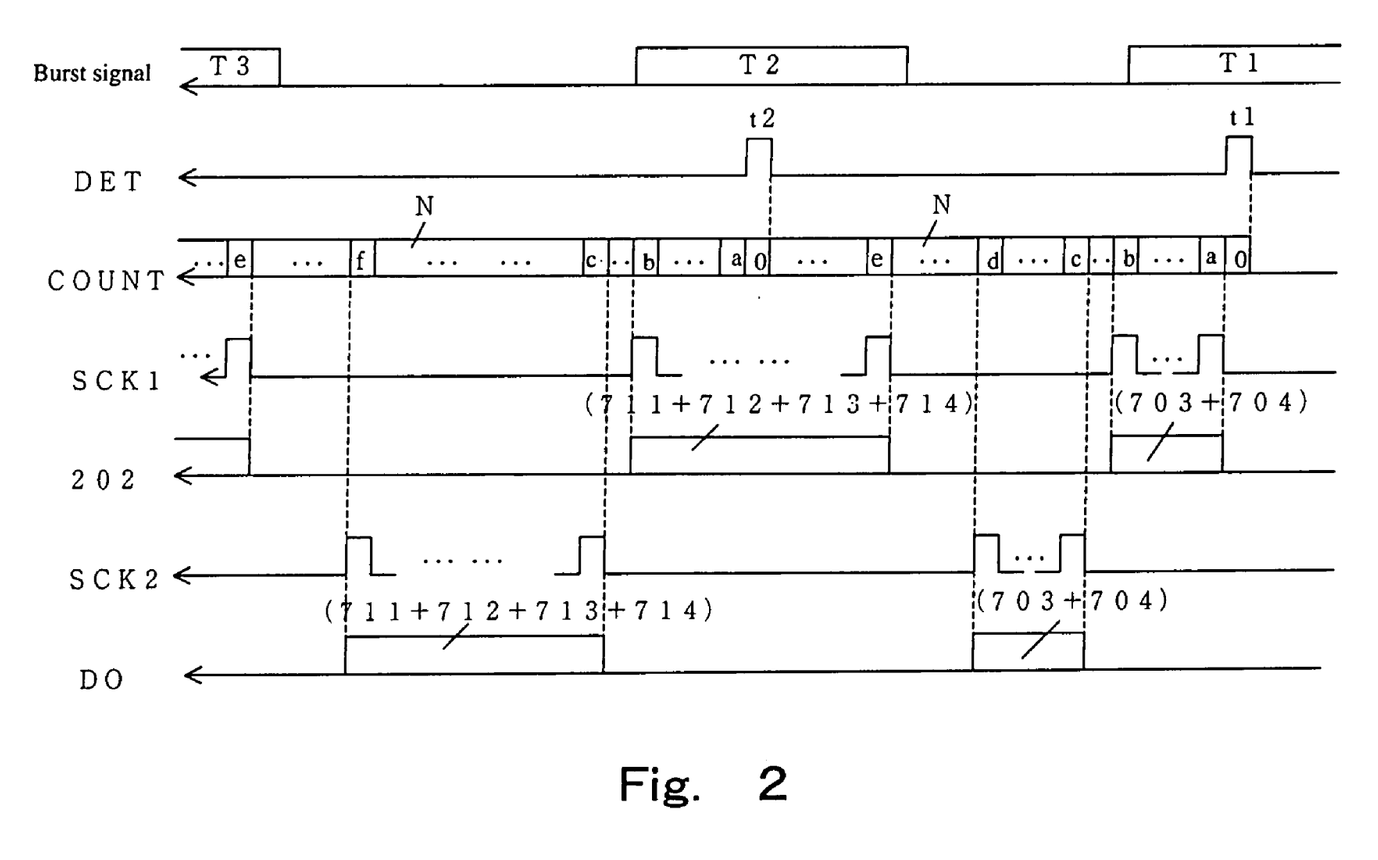
FIG. 2 is a timing chart for describing the operation of the receiving circuit according to the first embodiment of the present invention.

A receiving circuit according to a first embodiment of the present invention will hereinafter be described in detail with reference to the accompanying drawings. FIGS. 1 and 2 are respectively diagrams related to the receiving circuit according to the first embodiment of the present invention and its operation. FIG. 1 shows a structure of the receiving circuit according to the first embodiment of the present invention, and FIG. 2 is a timing chart for describing the operation of the receiving circuit according to the first embodiment of the present invention, respectively.

A configuration of the receiving circuit according to the first embodiment of the present invention and operations of each individual components will first be explained. As shown in FIG. 1, the receiving circuit according to the first embodiment of the present invention comprises a demodulator 101, a storage unit 102 and a controller 110.

The demodulator 101 brings or pulls in the phase of a received burst signal, based on phase information stored in a preamble part of the received burst signal (radio signal) RF. The demodulator 101 reproduces synchronous information stored in a synchronous pattern part, data stored in a data part, and error-correcting code information stored in a CRC data part and outputs the same as demodulated data RD therefrom. Here, the demodulator 101 may also reproduce the phase information stored in the preamble part and output it as demodulated data RD therefrom. Incidentally, even when data is stored in the preamble part, the demodulator 101 may reproduce it and output it as demodulated data RD therefrom.

The controller 110 comprises a synchronous pattern detector 111, a counting unit 112 and a timing generator 113.

The synchronous pattern detector 111 detects synchronous information of the demodulated data RD and outputs a detection signal DET therefrom. Here, the synchronous pattern detector 111 is configured so as to output a one-shot pulse whose voltage level is temporarily brought to a source voltage level (hereinafter called an "H level") only for a short time when desired synchronous information is detected, and to hold a ground voltage level (hereinafter called an "L level") as a voltage level when the desired synchronous information cannot be detected.

The counting unit 112 is a counter which comprises a plurality of flip-flops, for example. In this case, the counting unit 112 is configured so that the detection signal DET is inputted to reset terminals of the plurality of flip-flops. The counting unit 112 increments a count one by one in response to an internal clock for activating the receiving circuit and sequentially outputs each incremented count COUNT. When the detection signal DET is inputted to the counting unit 112, the counting unit 112 restores each count to an initial value in synchronism with the rising edge of the detection signal DET and increments the count restored to the initial value again one by one. When the initial value is set as "0 (zero)", for example, the counting unit 112 increments the count one by one in response to the internal clock as in the case of 0, 1, 2, . . . , n–1, n (where n: integer). When the detection signal DET is inputted to the counting unit 112, the counting unit 112 returns the count to the initial value "0" and increments the count again one by one in response to the internal clock. Incidentally, the counting unit 112 may be configured so as to decrement the count one by one.

The timing generator 113 includes a storage unit which stores a plurality of set values therein, and a comparator which makes comparisons between the stored set values and the input count COUNT. The timing generator 113 generates and outputs timing signals, based on the result of comparisons between the stored set values and the input count COUNT. Here, the timing signals are known generically as a first timing signal SCK1 (receiving data shift clock SCK1) by which the storage unit 102 stores the demodulated data RD therein, and a second timing signal SCK2 (output data shift clock SCK2) by which the storage unit 102 outputs the stored demodulated data RD. A description will now be made of the plural set values included in the timing generator 113 with reference to FIG. 2. A first set value a indicates a timing provided to start the storage of data and error-correcting code information for demodulated data RD of a previously-received burst signal. A second set value b indicates a timing provided to terminate the storage of the data and error-correcting code information for the modulated RD of the previously-received burst signal. A third set value c indicates a timing provided to start the output of the data and error-correcting code information for the stored demodulated RD. A fourth set value d indicates a timing provided to complete the output of the data and error-correcting code information for the stored demodulated RD. A fifth set value e indicates a timing provided to start the storage of phase information (when data equivalent to the data stored in the data part is stored, the corresponding data) stored in a preamble part of a burst signal to be next received, synchronous information, the data stored in the data part thereof, and error-correcting code information. A sixth set value f indicates a timing provided to terminate the output of the stored phase information or data, the synchronous information, the data stored in the data part and the error-correcting code information. Here, the second set value balso indicates a timing provided to finish the storage of phase information or data stored in a preamble part in a burst signal to be next received, synchronous information, data stored in a data part thereof, and error-correcting code information. The third set value c also indicates a timing provided to start the output of phase information or data stored in a stored preamble part, synchronous information, data stored in a data part, and error-correcting code information. Incidentally, the number of the set values is not limited to six. It is needless to say that the number of the set values may increase or decrease according to the configuration of the timing generator 113.

Here, the timing generator 113 may be configured so as to store the demodulated data RD (corresponding to the data and error-correcting code information stored in the data parts) therein in response to the input of the detection signal DET.

The storage unit 102 comprises a shift register, for example. The storage unit 102 stores or outputs the demodulated data RD, based on timing signals outputted from the controller 110. Described specifically, the storage unit 102 stores the demodulated data RD (corresponding to the phase information or data stored in the preamble part, the synchronous information, the data stored in the data part, and the error-correcting code information) in the burst signal while the first timing signal SCK1 is being inputted thereto, and outputs the demodulated data RD while a second timing signal SCK2 is being inputted thereto. Here, it is needless to say that the storage unit 102 is set so as to store and output the error-correcting code information but can be set so as not to store it according to user-based specifications of the receiving circuit.

The operation of the receiving circuit according to the first embodiment of the present invention will next be explained with reference to FIG. 2. The receiving circuit according to the first embodiment of the present invention receives burst signals at times T1, T2, T3, . . . . Let's now assume that when the receiving circuit receives a burst signal at a time T1, it detects synchronous information from or based on the burst signal at the time T1 without detecting synchronous information from or based on a previously-received burst signal.

At the time T1, the demodulator 101 receives a burst signal having a preamble part having stored phase information therein. The demodulator 101 pulls in the phase of the received burst signal through the use of the phase information. Further, the demodulator 101 reproduces or demodulates synchronous information stored in a synchronous pattern part of the burst signal, data stored in a data part thereof, and error-correcting code information stored in a CRC data part thereof and outputs the same as demodulated data RD therefrom. Next, at the time T2, the demodulator 101 receives a burst signal having a preamble part in which phase information or data is stored. The demodulator 101 reproduces the phase information or data stored in the preamble part of the burst signal, synchronous information stored in a synchronous pattern part thereof, data stored in a data part thereof, and error-correcting code information stored in a CRC data part thereof and outputs the same as demodulated data RD therefrom.

The synchronous pattern detector 111 detects the synchronous information of the demodulated data RD from the burst signals at the times T1 and T2 and outputs detection signals DET (times t1 and t2).

When the detection signals DET detected at the times t1 and t2 are inputted to the counting unit 112, the counting unit 112 restores a count to an initial value "0" in synchronism with each of the rising edges of the detection signals DET and increments the count one by one. The counting unit 112 sequentially outputs each individual incremented counts.

When the input count is equal to a first set value a, the timing generator 113 starts to output a first timing signal SCK1. When the input count is equal to a second set value b, the timing generator 113 completes the output of the first timing signal SCK1. When the input count is equal to a third set value c, the timing generator 113 starts the output of a second timing signal SCK2. When the input count is equal to a fourth set value d, the timing generator 113 terminates the output of the second timing signal SCK2. Further, when the input count is equal to a fifth set value e, the timing generator 113 starts the output of a first timing signal SCK1. When the input count is equal to the second set value b, the timing generator 113 finishes the output of the first timing signal SCK1. Incidentally, the count is temporarily returned to the initial value "0" during a period in which the count ranges from the fifth set value e to the second set value b. Further, when the input count is equal to the third set value c, the timing generator 113 starts the output of a second timing signal SCK2. When the input count is equal to a sixth set value f, the timing generator 113 completes the output of the second timing signal SCK2. When the input count is equal to the fifth set value e, the timing generator 113 starts the output of a first timing signal SCK1. Thus, the timing generator 113 produces timing signals, based on the set values a, b, c, d and e when the synchronous information is first detected. When the synchronous information is already detected, the timing generator 113 produces timing signals, based on the set values a, b, c, f and e.

When the first timing signal SCK1 produced based on the first set value a is inputted to the storage unit 102, the storage unit 102 starts to store data (hereinafter called data 703) stored in a data part 703 of demodulated data RD (reproduced burst signal at the time T1) and error-correcting code information (hereinafter called error-correcting code information 704) stored in a CRC data part 704 thereof. Further, when the first timing signal SCK1 produced based on the second set value b is inputted to the storage unit 102, the storage unit 102 completes the storage of the data 703 and error-correcting code information 704.

When the second timing signal SCK2 produced based on the third set value c is inputted to the storage unit 102, the storage unit 102 starts the output of stored data 703 and error-correcting code information 704. When the second timing signal SCK2 produced based on the fourth set value d is inputted to the storage unit 102, the storage unit 102 finishes the output of the stored data 703 and error-correcting code information 704.

When the first timing signal SCK1 produced based on the fifth set value e is inputted to the storage unit 102, the storage unit 102 starts the storage of phase information or data (hereinafter called data 711) stored in a preamble part 711 of demodulated data RD (reproduced burst signal at the time T2) and synchronous information (hereinafter called synchronous information 712) stored in a synchronous pattern part 712 thereof. The storage unit 102 consecutively inputs a first timing signal SCK1 produced based on a first set value a therein and starts the storage of data (hereinafter called data 713) stored in a data part 713 of the demodulated data RD (reproduced burst signal at the time T2), and error-correcting code information (hereinafter called error-correcting code information 714) stored in a CRC data part 714 thereof. When a first timing signal SCK1 produced based on a second set value b is inputted to the storage unit 102, the storage unit 102 finishes the storage of the data 711, synchronous information 712, data 713 and error-correcting code information 714 therein.

When the second timing signal SCK2 produced based on the third set value c is inputted to the storage unit 102, the storage unit 102 starts the output of stored data 711, synchronous information 712, data 713 and error-correcting code information 714 therefrom. Further, when the second timing signal SCK2 produced based on the sixth set value f is inputted to the storage unit 102, the storage unit 102 completes the output of the stored data 711, synchronous information 712, data 713 and error-correcting code information 714.

When the first timing signal SCK1 produced based on the fifth set value e is inputted to the storage unit 102, the storage unit 102 starts to store phase information or data stored in a preamble part of demodulated data RD (reproduced burst signal at the time T3) and synchronous information stored in a synchronous pattern part thereof. Subsequently, the storage unit 102 performs operations similar to above. Thus, when the timing signals produced based on the set values a and e are inputted to the storage unit 102, the storage unit 102 starts the storage of the demodulated data RD therein. When the timing signal produced based on the set value b is inputted to the storage unit 102, the storage unit 102 finishes the storage of the demodulated data RD therein. Further, when the timing signal produced based on the set value c is inputted to the storage unit 102, the storage unit 102 starts the output of the demodulated data RD. When the timing signals produced based on the set values d and f are inputted to the storage unit 102, the storage unit 102 terminates the output of the demodulated data RD therefrom.

According to the receiving circuit showing the first embodiment of the present invention, the following advantageous effects are brought about.

(1) The receiving circuit according to the first embodiment of the present invention is provided with a counting unit, which counts synchronous information of a previously-received burst signal, based on the result of detection. Thus, the present receiving circuit can determine a timing provided to store phase information or data stored in a preamble part of a burst signal to be next received, through the use of the count.

(2) Since the receiving circuit according to the first embodiment of the present invention is also capable of storing phase information stored in a preamble part, it can use the preamble part as a virtual data part. Thus, the present receiving circuit is capable of performing transmission and reception of lots of data by a once-inputted burst signal.

(3) Further, even if synchronous information of a burst signal to be next received is not detected, the receiving circuit according to the first embodiment of the present invention can predict a receiving timing provided for the burst signal to be next received, based on the previously-received synchronous information, and store data or the like therein. Thus, even if the synchronous information of the burst signal to be next received is not detected, a bit error rate can be measured accurately.

Second Preferred Embodiment

Figure 3:
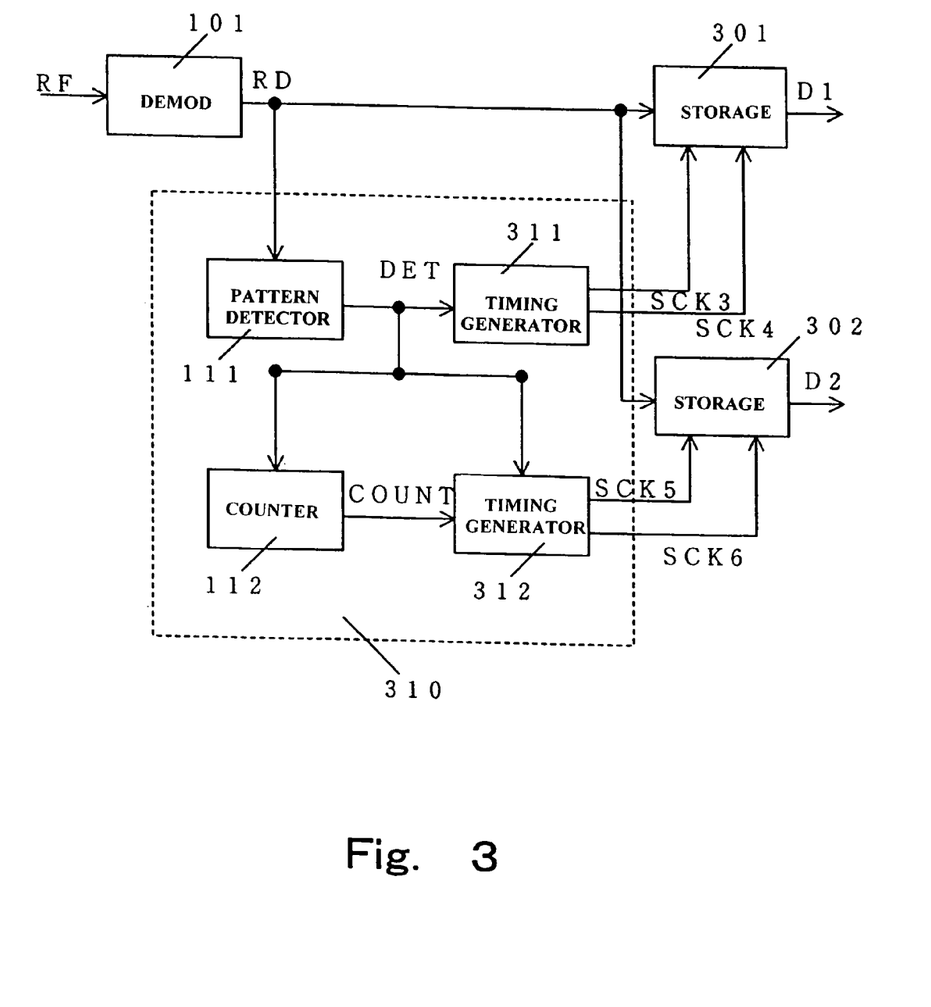
FIG. 3 is a block diagram illustrating a structure of a receiving circuit according to a second embodiment of the present invention.
Figure 4:
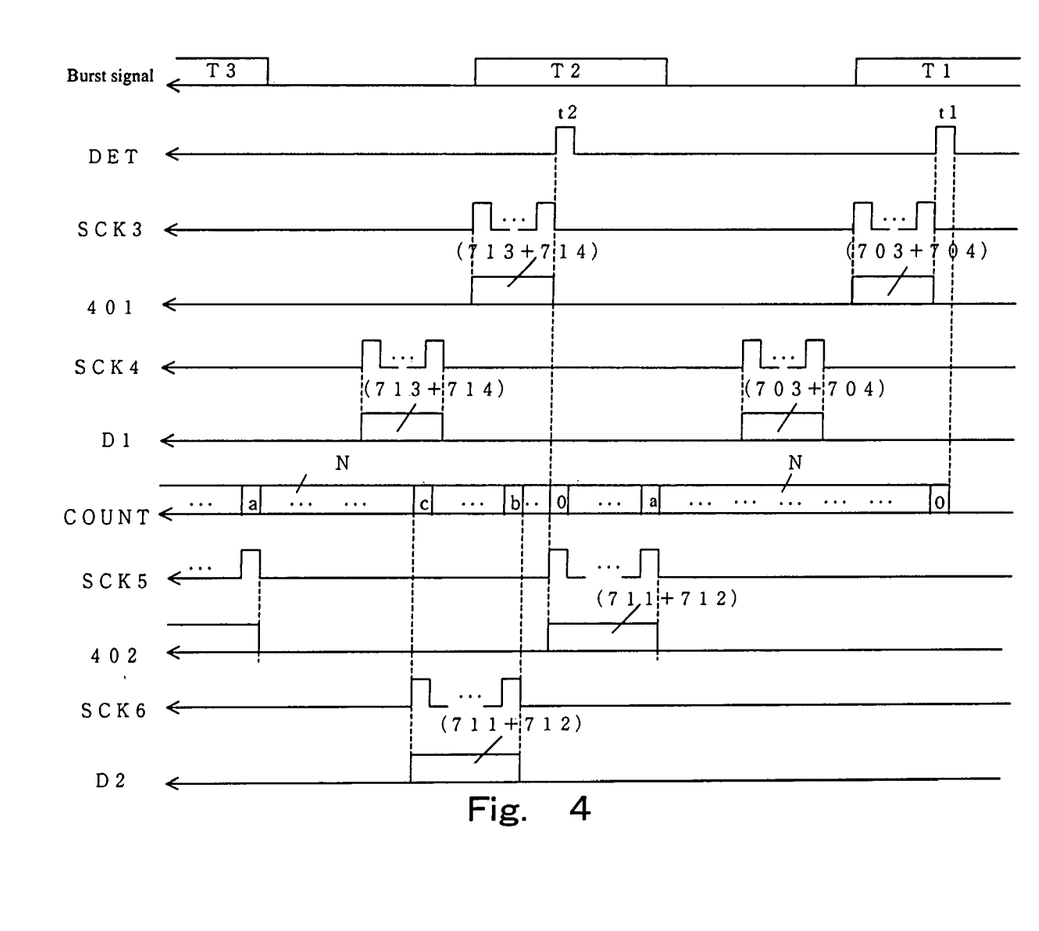
FIG. 4 is a timing chart for describing the operation of the receiving circuit according to the second embodiment of the present invention.

A receiving circuit according to a second embodiment of the present invention will hereinafter be described in detail with reference to the accompanying drawings. FIGS. 3 and 4 are respectively diagrams related to the receiving circuit according to the second embodiment of the present invention and its operation. FIG. 3 shows a structure of the receiving circuit according to the second embodiment of the present invention, and FIG. 4 is a timing chart for describing the operation of the receiving circuit according to the second embodiment of the present invention, respectively.

A configuration of the receiving circuit according to the second embodiment of the present invention and operations of each individual components will first be explained. As shown in FIG. 3, the receiving circuit according to the second embodiment of the present invention comprises a demodulator 101, a first storage unit 301, a second storage unit 302 and a controller 310.

The controller 310 comprises a synchronous pattern detector 111, a counting unit 112, a first timing generator 311 and a second timing generator 312.

The first timing generator 311 produces and outputs each of timing signals, based on a detection signal DET detected by the synchronous pattern detector 111.

The second timing generator 312 has a storage unit which stores a plurality of set values therein, and a comparator which makes comparisons between the stored set values and an input count COUNT. The second timing generator 312 generates and outputs timing signals, based on the result of comparisons between the stored set values and the input count COUNT. Here, the timing signals are known generically as a first timing signal SCK3 (first receiving data shift clock SCK3) by which the first storage unit 301 stores demodulated data RD therein, a second timing signal SCK4 (first output data shift clock SCK4) by which the first storage unit 301 outputs the stored demodulated data RD, a third timing signal SCK5 (second receiving data shift clock SCK5) by which the second storage unit 302 stores the demodulated data RD therein, and a fourth timing signal SCK6 (second output data shift clock SCK6) by which the second storage unit 302 outputs the stored demodulated data RD. A description will now be made of the plural set values included in the second timing generator 312 with reference to FIG. 4. A first set value a indicates a timing provided to start the storage of phase information (when data equivalent to data stored in a data part is stored, the corresponding data) stored in a preamble part of demodulated data RD of a burst signal to be next received and synchronous information. A second set value b indicates a timing provided to start the output of the phase information or data stored in the preamble part of the stored demodulated data RD of the burst signal to be next received and the synchronous information. A third set value c indicates a timing provided to complete the output of the phase information or data stored in the preamble part of the stored demodulated data RD of the burst signal to be next received and the synchronous information. When a detection signal DET is inputted to the second timing generator 312, the second timing generator 312 terminates the storage of the phase information or data stored in the preamble part of the demodulated data RD of the burst signal to be next received and the synchronous information. Incidentally, the number of the set values is not limited to three. It is needless to say that the number of the set values may increase or decrease according to the configuration of the second timing generator 312.

The first and second storage units 301 and 302 comprise, for example, shift registers respectively. The first and second storage units 301 and 302 store or output demodulated data RD, based on timing signals outputted from the controller 310. Described specifically, the first storage unit 301 stores demodulated data RD (corresponding to data and error-correcting code information stored in their corresponding data parts) of a burst signal while a first timing signal SCK3 is being inputted thereto, and outputs the stored demodulated data RD while a second timing signal SCK4 is being inputted thereto. Further, the second storage unit 302 stores demodulated data RD (corresponding to phase information or data stored in a preamble part and synchronous information) of a burst signal while a third timing signal SCK5 is being inputted thereto, and outputs the stored demodulated data RD while a fourth timing signal SCK6 is being inputted thereto. Here, it is needless to say that while the first storage unit 301 is set so as to store and output the error-correcting code information and the second storage unit 302 is set so as to store and output the synchronous information, they can be set so as not to store them according to user-based specifications of the receiving circuit.

The operation of the receiving circuit according to the second embodiment of the present invention will next be explained with reference to FIG. 4. The receiving circuit according to the second embodiment of the present invention receives burst signals at times T1, T2, T3, . . . . Let's now assume that when the receiving circuit receives a burst signal at a time T1, it detects synchronous information, based on the burst signal at the time T1 without detecting synchronous information on the basis of a previously-received burst signal.

When each detection signal DET is inputted to the first timing generator 311, the first timing generator 311 outputs a first timing signal SCK3 for a predetermined time. When the first timing generator 311 have finished the output of the first timing signal SCK3, the first timing generator 311 outputs a second timing signal SCK4 for a predetermined time.

When an input count is equal to a first set value a, the second timing generator 312 starts the output of a third timing signal SCK5. When a detection signal DET is inputted to the second timing generator 312, the second timing generator 312 completes the output of the third timing signal SCK5. When the input count is equal to a second set value b, the second timing generator 312 starts to output a fourth timing signal SCK6. When the input count is equal to a third set value c, the second timing generator 312 terminates the output of the fourth timing signal SCK6.

While the first timing signal SCK3 produced based on the detection signal DET is being inputted to the first storage unit 301, the first storage unit 301 stores therein data (hereinafter called data 703) stored in a data part 703 of demodulated data RD (reproduced burst signal at the time T1), and error-correcting code information (hereinafter called error-correcting code information 704) stored in a CRC data part 704 thereof. While the second timing signal SCK4 is being inputted to the first storage unit 301, the first storage unit 301 outputs the stored data 703 and error-correcting code information 704.

While the first timing signal SCK3 produced based on the detection signal DET is being inputted to the first storage unit 301, the first storage unit 301 stores therein data (hereinafter called data 713) stored in a data part 713 of demodulated data RD (reproduced burst signal at the time T2) and error-correcting code information (hereinafter called error-correcting code information 714) stored in a CRC data part 714 thereof. While the second timing signal SCK4 is being inputted to the first storage unit 301, the first storage unit 301 outputs the stored data 713 and error-correcting code information 714. Subsequently, the first storage unit 301 performs similar operations. Thus, the first storage unit 301 stores or outputs the data and error-correcting code information stored in their corresponding data parts, based on the detection of the detection signal DET.

When the third timing signal SCK5 produced based on the first set value a is inputted to the second storage unit 302, the second storage unit 302 starts the storage of phase information or data (hereinafter called data 711) stored in a preamble part 711 of demodulated data RD (reproduced burst signal at the time T2) and synchronous information (hereinafter called synchronous information 712) stored in a synchronous pattern part 712 thereof. When the third timing signal SCK5 produced based on the detection signal DET is inputted to the second storage unit 302, the second storage unit 302 finishes the storage of the data 711 and synchronous information 712.

When the third timing signal SCK5 produced based on the first set value a is inputted to the second storage unit 302, the second storage unit 302 starts the storage of phase information or data stored in a preamble part of demodulated data RD (reproduced burst signal at the time T3) and synchronous information stored in a synchronous pattern part thereof. Subsequently, the second storage unit 302 performs similar operations. Thus, when the timing signal produced based on the set value a is inputted to the second storage unit 302, the second storage unit 302 starts to store the demodulated data RD therein. When the timing signal produced based on the detection signal DET is inputted to the second storage unit 302, the second storage unit 302 finishes the storage of the demodulated data RD therein. When the timing signal produced based on the set value b is inputted to the second storage unit 302, the second storage unit 302 starts to output the demodulated data RD therefrom. When the timing signal produced based on the set value c is inputted to the second storage unit 302, the second storage unit 302 terminates the output of the demodulated data RD therefrom.

According to the receiving circuit illustrative of the second embodiment of the present invention, the following advantageous effect is brought about in addition to the advantageous effects (1) and (2) obtained in the receiving circuit according to the first embodiment of the present invention.

(4) The receiving circuit according to the second embodiment of the present invention divides a storage unit into a storage unit for storing/outputting data stored in a preamble part and synchronous information stored in a synchronous pattern part, and a storage unit for storing/outputting data stored in a data part and error-correcting code information stored in a CRC data part. Therefore, the data or the like can be outputted from the other storage unit while the data or the like is being stored in one storage unit. So-called parallel processing can be performed. It is thus possible to distribute time intervals required to store and output the data or the like and implement high-speed processing.

Third Preferred Embodiment

Figure 5:
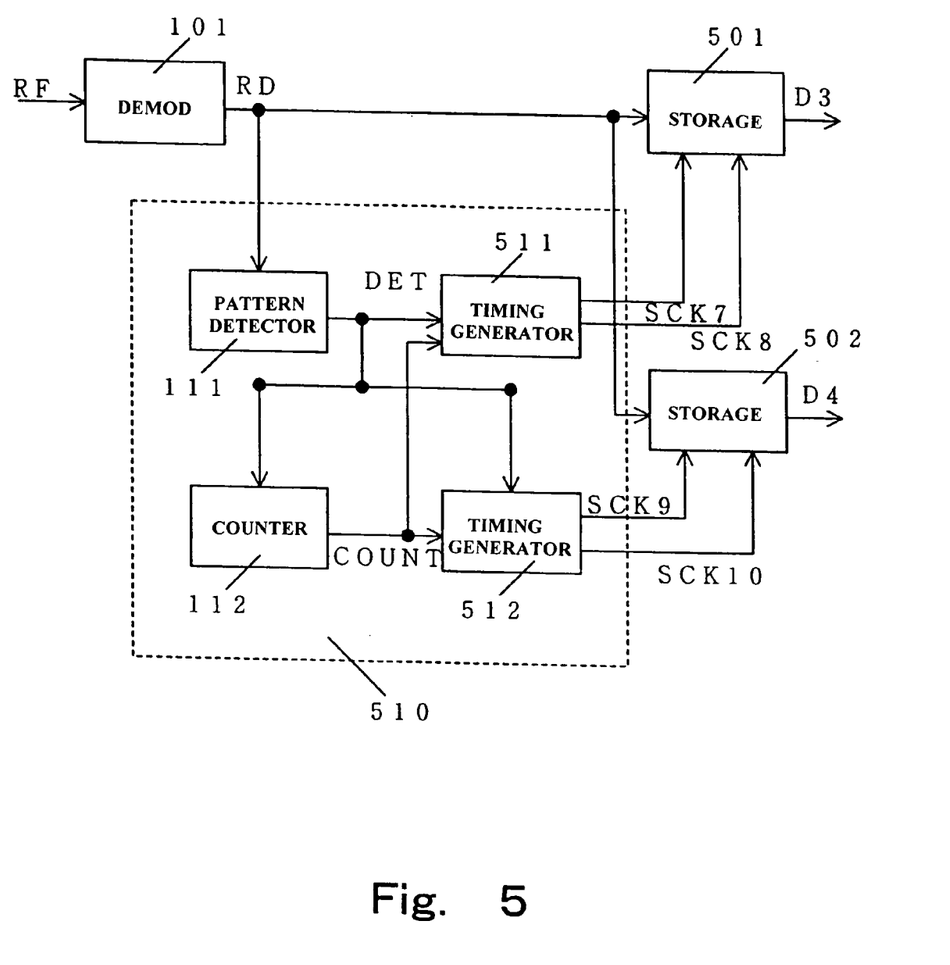
FIG. 5 is a block diagram showing a structure of a receiving circuit according to a third embodiment of the present invention.
Figure 6:
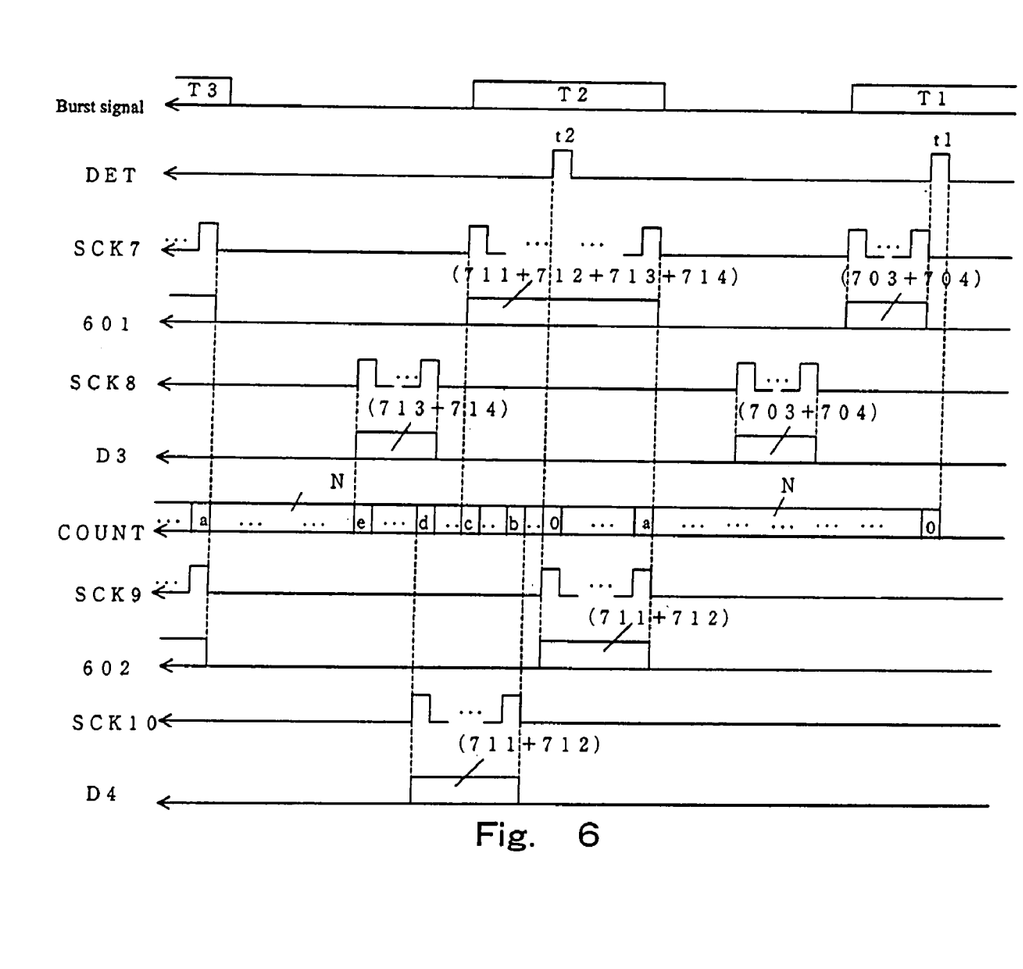
FIG. 6 is a timing chart for describing the operation of the receiving circuit according to the third embodiment of the present invention.

A receiving circuit according to a third embodiment of the present invention will hereinafter be described in detail with reference to the accompanying drawings. FIGS. 5 and 6 are respectively diagrams related to the receiving circuit according to the third embodiment of the present invention and its operation. FIG. 5 shows a structure of the receiving circuit according to the third embodiment of the present invention, and FIG. 6 is a timing chart for describing the operation of the receiving circuit according to the third embodiment of the present invention, respectively.

A configuration of the receiving circuit according to the third embodiment of the present invention and operations of each individual components will first be explained. As shown in FIG. 5, the receiving circuit according to the third embodiment of the present invention comprises a demodulator 101, a first storage unit 501, a second storage unit 502 and a controller 510.

The controller 510 comprises a synchronous pattern detector 111, a counting unit 112, a first timing generator 511 and a second timing generator 512.

The first and second timing generators 511 and 512 respectively have storage units each of which stores a plurality of set values therein, and comparators each of which makes comparisons between the stored set values and an input count COUNT. The first and second timing generators 511 and 512 respectively generate and output timing signals, based on the result of comparisons between the stored set values and the input count COUNT. Here, the timing signals are known generically as a first timing signal SCK7 (first receiving data shift clock SCK7) by which the first storage unit 501 stores demodulated data RD therein, a second timing signal SCK8 (first output data shift clock SCK8) by which the first storage unit 501 outputs the stored demodulated data RD, a third timing signal SCK9 (second receiving data shift clock SCK9) by which the second storage unit 502 stores the demodulated data RD therein, and a fourth timing signal SCK10 (second output data shift clock SCK10) by which the second storage unit 502 outputs the stored demodulated data RD.

A description will now be made of the plural set values included in the first timing generator 511 with reference to FIG. 6. A first set value a indicates a timing provided to start the storage of phase information (when data equivalent to data stored in a data part is stored, the corresponding data) stored in a preamble part of demodulated data RD of a burst signal to be next received, synchronous information, the data stored in the data part, and error-correcting code information. A second set value c indicates a timing provided to complete the storage of the phase information or data stored in the preamble part of the demodulated data RD of the burst signal to be next received, the synchronous information, the data stored in the data part and the error-correcting code information. A third set value d indicates a timing provided to start the output of the phase information or data stored in the preamble part of the stored demodulated data RD of the burst signal to be next received, the synchronous information, the data stored in the data part and the error-correcting code information. A fourth set value e indicates a timing provided to end the output of the data stored in the data part of the stored demodulated data RD of the burst signal to be next received, and the error-correcting code information. Incidentally, the first timing generator 511 generates and outputs each timing signal, even based on a detection signal DET detected by the synchronous pattern detector 111. It is needless to say that the number of the set values is not limited to four and may increase or decrease according to the configuration of the first timing generator 511.

A description will next be made of the plural set values included in the second timing generator 512. A first set value a indicates a timing provided to start the storage of phase information (when data equivalent to data stored in a data part is stored, the corresponding data) stored in a preamble part of demodulated data RD of a burst signal to be next received and synchronous information. A fifth set value b indicates a timing provided to start the output of the phase information or data stored in the preamble part of the stored demodulated data RD of the burst signal to be next received and the synchronous information. A third set value d indicates a timing provided to complete the output of the phase information or data stored in the preamble part of the stored demodulated data RD of the burst signal to be next received and the synchronous information. When a detection signal DET is inputted to the second timing generator 512 here, the second timing generator 512 terminates the storage of the phase information or data stored in the preamble part of the demodulated data RD of the burst signal to be next received and the synchronous information. Incidentally, the number of the set values is not limited to three. It is needless to say that the number of the set values may increase or decrease according to the configuration of the second timing generator 512.

The first and second storage units 501 and 502 comprise, for example, shift registers respectively. The first and second storage units 501 and 502 respectively store or output demodulated data RD, based on timing signals outputted from the controller 510. Described specifically, the first storage unit 501 stores demodulated data RD (corresponding to phase information or data stored in a preamble part thereof, synchronous information, data stored in a data part, and error-correcting code information) of a burst signal while a first timing signal SCK7 is being inputted thereto, and outputs the stored demodulated data RD (corresponding to data stored in a data part and error-correcting code information) while a second timing signal SCK8 is being inputted thereto. Here, the first storage unit 501 stores phase information or data stored in a preamble part of demodulated data RD, synchronous information, and data and error-correcting code information stored in data parts thereof but outputs the data and error-correcting code information stored in the data parts. This is because the second storage unit 502 stores and outputs phase information or data stored in a preamble part of demodulated data RD and synchronous information. However, the second storage unit 502 may output all the stored demodulated data RD according to user's specifications. Further, the second storage unit 502 stores demodulated data RD (corresponding to phase information or data stored in a preamble part and synchronous information) of a burst signal while a third timing signal SCK9 is being inputted thereto, and outputs the stored demodulated data RD while a fourth timing signal SCK10 is being inputted thereto. Here, it is needless to say that while the first storage unit 501 is set so as to store and output the synchronous information and error-correcting code information and the second storage unit 502 is set so as to store and output the synchronous information, they can be set so as not to store them according to user-based specifications of the receiving circuit.

The operation of the receiving circuit according to the third embodiment of the present invention will next be explained with reference to FIG. 6. The receiving circuit according to the third embodiment of the present invention receives burst signals at times T1, T2, T3, . . . . Let's now assume that when the receiving circuit receives a burst signal at a time T1, it detects synchronous information, based on the burst signal at the time T1 without detecting synchronous information from a previously-received burst signal.

When a detection signal DET is inputted to the first timing generator 511 on the basis of the burst signal at the time T1, the first timing generator 511 outputs a first timing signal SCK7 for a predetermined time. When the first timing generator 511 have finished the output of the first timing signal SCK7 with respect to each burst signal at the time T2 or later, the first timing generator 511 outputs a second timing signal SCK8 for a predetermined time. When an input count is equal to a first set value a, the first timing generator 511 starts to output the first timing signal SCK7. When the input count is equal to a second set value c, the first timing generator 511 terminates the output of the first timing signal SCK7. When the input count is equal to a third set value d, the first timing generator 511 starts the output of a second timing signal SCK8. When the input count is equal to a fourth set value e, the first timing generator 511 terminates the output of the second timing signal SCK8.

When the input count is equal to a first set value a, the second timing generator 512 starts to output a third timing signal SCK9. When a detection signal DET is inputted to the second timing generator 512, the second timing generator 512 terminates the output of the third timing signal SCK9. When the input count is equal to a fifth set value b, the second timing generator 512 starts the output of a fourth timing signal SCK10. When the input count is equal to the third set value d, the second timing generator 512 completes the output of the fourth timing signal SCK10 therefrom.

While the first timing signal SCK7 produced based on the detection signal DET on the basis of the burst signal at the time T1 is being inputted to the first storage unit 501, the first storage unit 501 stores therein data (hereinafter called data 703) stored in a data part 703 of demodulated data RD (reproduced burst signal at the time T1), and error-correcting code information (hereinafter called error-correcting code information 704) stored in a CRC data part 704 thereof. While the second timing signal SCK8 is being inputted to the first storage unit 501, the first storage unit 501 outputs the stored data 703 and error-correcting code information 704.

When the first timing signal SCK7 produced based on the first set value a is inputted to the first storage unit 501, the first storage unit 501 starts to store therein phase information or data (hereinafter called data 711) stored in a preamble part 711 of demodulated data RD (reproduced burst signal at the time T2), synchronous information (hereinafter called synchronous information 712) stored in a synchronous pattern part 712 thereof, data (hereinafter called data 713) stored in a data part 713 thereof, and error-correcting code information (hereinafter called error-correcting code information 714) stored in a CRC data part 714 thereof. When the first timing signal SCK7 produced based on the second set value c is inputted to the first storage unit 501, the first storage unit 501 finishes the storage of the data 711, synchronous information 712, data 713 and error-correcting code information 714.

When the second timing signal SCK8 produced based on the third set value d is inputted to the first storage unit 501, the first storage unit 501 starts to output the stored data 713 and error-correcting code information 714. When the second timing signal SCK8 produced based on the fourth set value e is inputted to the first storage unit 501, the first storage unit 501 terminates the output of the stored data 713 and error-correcting code information 714. Subsequently, the first storage unit 501 performs similar operations. Thus, the first storage unit 501 stores or outputs the data and error-correcting code information stored in each individual data parts, based on the detection of the detection signal DET when the synchronous information is first detected. After the synchronous information has temporarily been detected, the first storage unit 501 starts to store the demodulated data RD when the timing signal produced based on the set value a is inputted thereto, whereas when the timing signal produced based on the set value c is inputted thereto, the first storage unit 501 completes the storage of the demodulated data RD. When the timing signal produced based on the set value d is inputted to the first storage unit 501, the first storage unit 501 starts to output the demodulated data RD. When the timing signal produced based on the set value e is inputted to the first storage unit 501, the first storage unit 501 terminates the output of the demodulated data RD therefrom.

When the third timing signal SCK9 produced based on the first set value a is inputted to the second storage unit 502, the second storage unit 502 starts to store phase information or data (hereinafter called data 711) stored in a preamble part 711 of demodulated data RD (reproduced burst signal at the time T2) and synchronous information (hereinafter called synchronous information 712) stored in a synchronous pattern part 712 thereof. When the third timing signal SCK9 produced based on the detection signal DET is inputted to the second storage unit 502, the second storage unit 502 finishes the storage of the data 711 and synchronous information 712 therein.

When the fourth timing signal SCK10 produced based on the fifth set value b is inputted to the second storage unit 502, the second storage unit 502 starts to output the stored data 711 and synchronous information 712. When the fourth timing signal SCK10 produced based on the third set value d is inputted to the second storage unit 502, the second storage unit 502 completes the output of the stored data 711 and synchronous information 712. Subsequently, the second storage unit 502 performs similar operations. Thus, when the timing signal produced based on the set value a is inputted to the second storage unit 502, the second storage unit 502 starts to store the demodulated data RD therein. When the timing signal produced based on the detection signal DET is inputted to the second storage unit 502, the second storage unit 502 finishes the storage of the demodulated data RD therein. When the timing signal produced based on the set value b is inputted to the second storage unit 502, the second storage unit 502 starts to output the demodulated data RD therefrom. When the timing signal produced based on the set value d is inputted to the second storage unit 502, the second storage unit 502 terminates the output of the demodulated data RD therefrom.

According to the receiving circuit showing the third embodiment of the present invention, the advantageous effects (1) through (4) obtained in the first or second embodiment of the present invention are brought about.

While the invention made by the present inventors as described above has been described specifically by the preferred embodiments, the present invention is not limited to the aforementioned embodiments. It is needless to say that various changes can be made thereto within the scope not departing from the substance thereof. While the data of the received burst signal have been read out based on the output data shift clocks, for example, they may be read directly from data-stored registers through the use of a CPU interface or the like.

An advantageous effect obtained by a typical one of the inventions disclosed in the present application will be described in brief as follows:

The present invention can provide a receiving circuit capable of storing therein information stored in a preamble part.

What is claimed is:

1. A receiving circuit, comprising:
   (a) a demodulator which pulls in a phase of a burst signal and outputs a demodulated data obtained by demodulating the burst signal, wherein the burst signal has a preamble part for storing phase information or data therein, a synchronous pattern part for storing synchronous information therein, and a data part for storing the data therein;
   (b) a controller which performs counting based on the demodulated data to output a first timing signal and a second timing signal, said controller including
       a synchronous pattern detector which detects synchronous information of the demodulated data to output a detection signal,
       a counting unit which performs counting based on the detection signal to output a count therefrom, and
       a timing generator having a plurality of set values, which compares the count and the set values and generates the first and second timing signals based on the result of comparison; and
   (c) a storage unit which stores the demodulated data or outputs the stored demodulated data, based on the first and second timing signals, said storage unit storing the demodulated data when the first timing signal is inputted thereto and outputs the stored demodulated data when the second timing signal is inputted thereto.

2. A receiving circuit comprising:
   a demodulator which pulls in a phase of a burst signal and outputs a demodulated data obtained by demodulating the burst signal, wherein the burst signal has a preamble part for storing phase information or data therein, a synchronous pattern part for storing synchronous information therein and a data part for storing the data therein;
   a controller which performs counting based on the demodulated data to output timing signals, wherein said controller includes a synchronous pattern detector which detects synchronous information of the demodulated data to output a detection signal, a counting unit which performs counting based on the detection signal to output a count therefrom, a first timing generator which generates a first timing generator timing signal based on the detection signal, and a second timing generator having a plurality of set values, which compares the count and the set values and generates second timing generator timing signals based on the result of comparison;

a first storage unit which stores the demodulated data stored in said data part, or outputs the stored demodulated dated stored in said data part based on the first timing generator timing signal; and a second storage unit which stores the demodulated phase information or data stored in the preamble part or outputs the stored demodulated phase information or data stored in the preamble part.

3. The receiving circuit according to claim 2, wherein said second timing generator generates a timing signal that is one of the second timing generator timing signals, based on the detection signal.

4. The receiving circuit according to claim 2, wherein said first timing generator generates a first timing signal and a second timing signal, including the first timing generator timing signal, based on the detection signal, the second timing generator timing signals include a third timing signal and a fourth timing signal, which are generated based on the result of comparison, said first storage unit stores the demodulated data stored in said data part when the first timing signal is inputted thereto and outputs the stored demodulated data stored in said data part when the second timing signal is inputted thereto, and said second storage unit stores the demodulated phase information or data stored in the preamble part when the third timing signal is inputted thereto and outputs the stored demodulated phase information or data stored in the preamble part when the fourth timing signal is inputted thereto.

5. The receiving circuit according to claim 2, wherein said first timing generator has a plurality of set values, and compares the count and the set values of said first timing generator and generates timing signals, including the first timing generator timing signal, based on the result of comparison.

* * * * *